(12) United States Patent
Dennis

(10) Patent No.: US 7,354,106 B2
(45) Date of Patent: Apr. 8, 2008

(54) IMPACT-INJURY-MINIMIZING SEAT STRUCTURE AND METHODOLOGY

(75) Inventor: Michael R. Dennis, Scappoose, OR (US)

(73) Assignee: MJD Innovations, LLC, Scappoose, OR (US)

( * ) Notice: Subject to any disclaimer, the term of this patent is extended or adjusted under 35 U.S.C. 154(b) by 0 days.

(21) Appl. No.: 10/898,486

(22) Filed: Jul. 22, 2004

(65) Prior Publication Data

US 2006/0061158 A1    Mar. 23, 2006

(51) Int. Cl.
*B60N 2/42* (2006.01)

(52) U.S. Cl. ............................... 297/216.17; 297/216.1

(58) Field of Classification Search ............ 297/216.1, 297/216.15, 216.16, 216.17, 311, 344.12, 297/338, 339; 280/730.1, 728.2, 735, 734; 180/271; 296/68.1; 244/122 R, 122 A, 244/141

See application file for complete search history.

(56) References Cited

U.S. PATENT DOCUMENTS

| | | | |
|---|---|---|---|
| 4,718,719 A * | 1/1988 | Brennan .................. 297/216.2 |
| 4,965,899 A | 10/1990 | Sekido et al. |
| 5,127,708 A | 7/1992 | Kishi et al. |
| 5,225,985 A | 7/1993 | Okano |
| 5,451,094 A * | 9/1995 | Templin et al. ........ 297/216.17 |
| 5,607,204 A * | 3/1997 | Gryp ..................... 297/284.11 |
| 5,695,242 A * | 12/1997 | Brantman et al. ........ 297/216.1 |
| 5,791,597 A * | 8/1998 | Knoll ......................... 244/121 |
| 5,800,013 A * | 9/1998 | Branham et al. ........... 297/232 |
| 5,803,491 A * | 9/1998 | Barnes et al. ............... 280/735 |
| 5,947,543 A * | 9/1999 | Hubbard .................... 296/68.1 |
| 6,129,376 A | 10/2000 | Haland |
| 6,158,766 A * | 12/2000 | Kowalski ................. 280/730.1 |
| 6,402,245 B1* | 6/2002 | Newton et al. ......... 297/284.11 |
| 6,467,099 B2* | 10/2002 | Dennis et al. .................. 2/455 |
| 6,623,033 B2* | 9/2003 | Breed ......................... 280/735 |
| 6,637,816 B2* | 10/2003 | Pavlov et al. ............ 297/216.2 |
| 6,682,141 B2* | 1/2004 | Reynolds et al. ........ 297/216.1 |
| 6,739,657 B2* | 5/2004 | Heilig et al. ............. 297/216.1 |
| 2001/0011427 A1 | 8/2001 | Seydel et al. |
| 2002/0121413 A1 | 9/2002 | Jurrens |

* cited by examiner

*Primary Examiner*—Sarah B. McPartlin
(74) *Attorney, Agent, or Firm*—Jon M. Dickinson, PC; Robert D. Varitz, PC

(57) ABSTRACT

A vehicle safety seat and related methodology featuring (a) an anti-spring-back seat platform having a generally upwardly facing support surface, (b) a triggerable acceleration structure disposed cooperatively relative to that support surface in a manner whereby the acceleration structure is operatively interposed that surface and any person occupying the seat, with this acceleration structure being triggerable to accelerate such a person generally upwardly away from the support surface, and (c) trigger structure responsive to the detection of a preselected downward deceleration of the seat platform to trigger the acceleration structure. A viscoelastic, acceleration-rate-sensitive cushioning structure is selectively interposed the acceleration structure and any seated occupant.

12 Claims, 1 Drawing Sheet

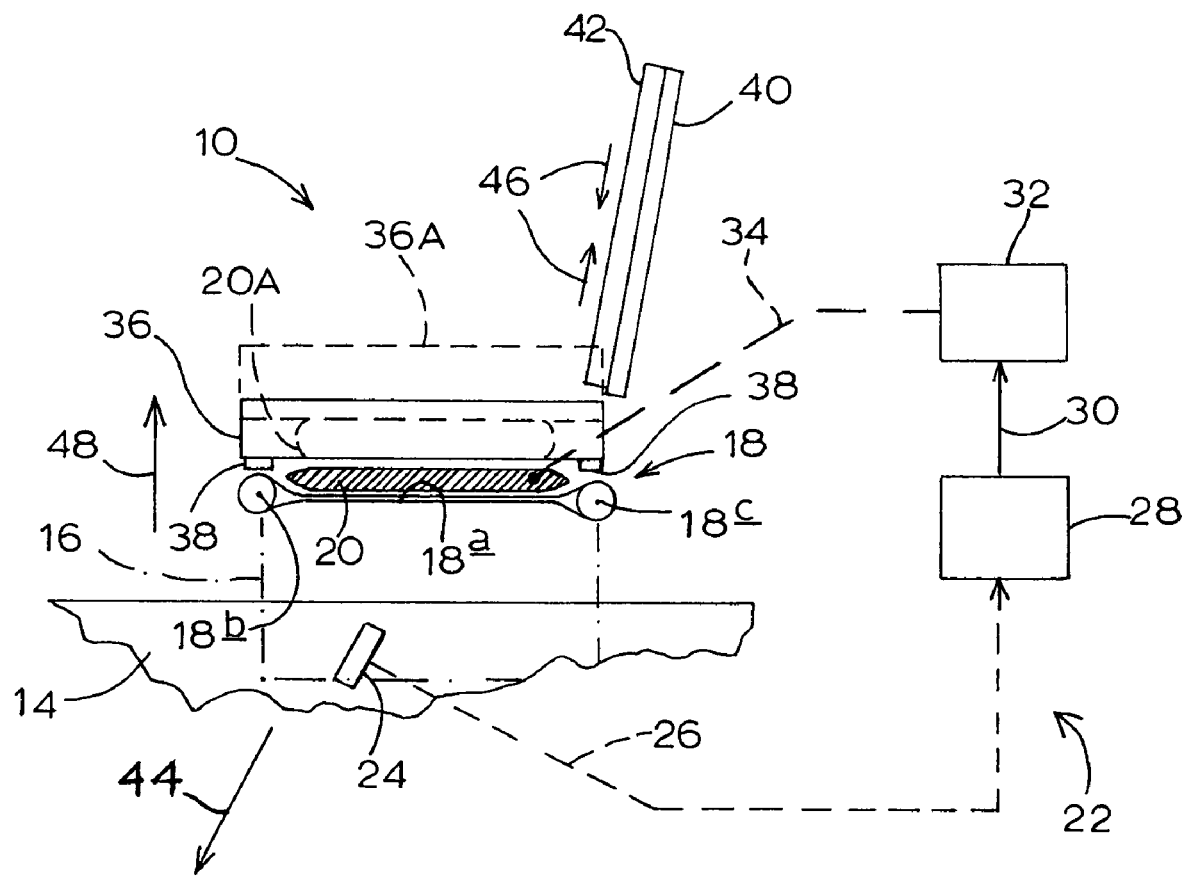
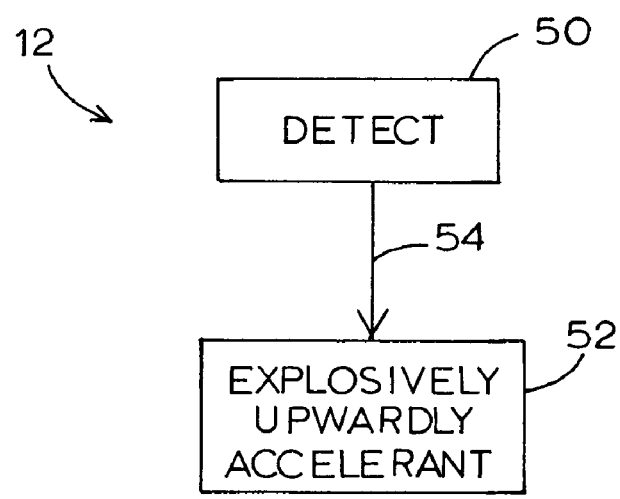
FIG.1
FIG.2

IMPACT-INJURY-MINIMIZING SEAT STRUCTURE AND METHODOLOGY

BACKGROUND AND SUMMARY OF THE INVENTION

The safety of passengers in vehicle seats in relation to the possibility of a high-speed catastrophic impact, such as an aircraft crash, has been high on the list of concerns for safety designers for years. Another kind of serious impact event, not widely experienced, but very threatening to military personnel who ride in extremely high-speed sea-going small vessels is a downward thrust into rough water approximating, or in fact replicating, a so-called State-III sea condition. Other kinds of similar events will also come to mind. Frequently, the key cause of death or disabling injury from an event of this nature is axial compression-overload (in excess of about 1500-lbs) to the spine. Many different approaches have been conceived and implemented to deal with events such as those just mentioned, but despite numerous efforts to date, there still occur large numbers of seat/impact, spinal-compression fatalities and serious injuries, solutions to which seem to be intractable in terms of minimization, let alone significantly resolution.

As suggested above, these disabling and fatal spinal injuries to seated vehicle occupants are usually traceable to high-G compression forces that are delivered axially (longitudinally) through the spine as a consequence of a crash, or crash-like, impact. Fundamentally, these forces come about because of the extraordinarily high decelerations which are experienced on account of the "downward" axial speed, and the resulting downward axial deceleration, of the spine beginning at the moment of, and thereafter developing in the few fragments of a second after (for example about 50-ms), initial impact.

The present invention takes square aim at this serious problem, and does so in a manner which may initially strike one as being significantly counter- or non-intuitive, and even incorrect in approach. Very specifically, what is proposed by the present invention is a specialized safety seat structure and methodology which utilize, in combination, an anti-spring-back seat platform, i.e. a very rigid seat platform, which is anchorable to the frame in a vehicle, and a triggerable, explosively reactive, upward acceleration structure which responds tiny fragments of a second (within about 50-ms) after a catastrophic downward impact and deceleration to propel a seat occupant upwardly away from whatever forms the underlying, supporting seat platform in the seat structure. This explosive upward acceleration introduces, importantly, a lower G-value (preferably just under about 15-G) than those forces which would otherwise typically be experienced following initiation of such an impact. The effect of the thus proposed upward acceleration is to diminish the effective downward velocity and the "downward deceleration" of the spine as a full-impact crash, or crash-like, event rapidly unfolds.

Test results of laboratory-sensitized human-form dummies, which have been subjected to this kind of an event repeatedly, have shown that axial compressive forces introduced into the spine during impact, with the present invention in place and operating, are in fact below the limit (about 20-G) which is recognized usually to cause serious spinal injury and/or a fatality as a consequence of such an impact.

As was mentioned above, the preferred form of the invention includes the basic combination just stated—a rigid seat platform, and a triggerable and explosive upward acceleration structure. It may also preferably include, in the interface between (a) whatever specific mechanism is employed to initiate upward acceleration, and (b) a seated occupant, a "sit upon" cushioning structure characterized with a behavior known as acceleration-rate-sensitivity—a characteristic which causes such a material to behave more and more like a solid as accelerative compression forces delivered through it increase in level.

While many different kinds of explosively active and triggerable upward acceleration mechanisms/structures may be employed successfully in the implementation and practice of the invention, the current preferred approach for implementing this invention involves using otherwise relatively conventional, explosively triggerable air-bag technology. The accelerations (not specifically elaborated herein) produced by this technology have been found to work well in the setting of the present invention. Thus, and in accordance with the preferred manner of implementing the invention, an appropriate undeflated air-bag bladder is suitably installed intermediate a rigid seat frame, or seat frame base, and the underside of an acceleration-rate-sensitive cushioning element, or structure, on top of which a seated occupant sits. An appropriate sensor, typically some form of conventional accelerometer, is incorporated, preferably into the seat base or frame, to respond within fragments of a second (within about 50-ms) after the onset of a downward impact, to initiate (trigger) an explosive inflation of the air bag which is appropriately and conventionally supplied with a source of compressed air, or other pressurized gas.

Though a seated occupant will typically be strapped effectively to the seat structure with a seatbelt harness, experience in the mentioned "dummy" tests has shown that there is sufficient "play" present which allows rapid "explosive" upward acceleration of an occupant of up to a distance of perhaps about 1-inch. This "play" provides enough freedom of action of the structure of this invention to achieve the desired reduction in downward impact velocity and deceleration which is responsible for producing dangerous compressive forces in a seated occupant's spine.

These and other features and advantages that are attained and offered by the present invention will become more fully apparent as the detailed description which now follows is read in conjunction with the accompanying drawings.

DESCRIPTION OF THE DRAWINGS

FIG. 1 is a simplified, fragmentary side elevation, partly in block/schematic form, generally illustrating a preferred structure for and manner of practicing the present invention in the setting of a vehicle, such as an aircraft.

FIG. 2 is a simplified block/schematic diagram generally illustrating the functional architecture of the methodology practiced by the structure of FIG. 1.

DETAILED DESCRIPTION OF THE DRAWINGS

Turning now to the drawings, indicated generally at 10 in FIG. 1 is a vehicle safety seat, or seat structure, which is constructed in accordance with a preferred embodiment of the present invention. Shown at 12 in FIG. 2, in block/schematic form, is an illustration of the seated-occupant, catastrophic-impact safety practice which is implemented and performed (the methodology) by seat structure 10, in accordance with a preferred manner of practicing the invention. Shown at 14 fragmentarily in FIG. 1 is a portion of a vehicle frame (in this case an aircraft frame) 14.

Seat structure 10 per se includes a rigid, non-springy seat frame, shown by dash-dot-lines 16, which frame is appropriately rigidly anchored in a non-springy manner to aircraft frame 14. Seat structure 10 also includes an anti-spring-back seat platform, or panel, or panel structure, 18 (also referred to herein as a seatpan) which is rigidly (in an anti-springy manner) anchored to seat frame 16, and which includes an upwardly facing, generally planar, seated-occupant support surface, or support expanse, 18*a*. Expanse 18*a*, also called herein a reaction structure, is formed preferably of a thin, closed-loop wrap of fabric-like material including strands of carbon fiber supported directly by (wrapped around) fore and aft, elongate subframe panel-structure members 18*b*, 18*c*, respectively.

Details of preferred constructions for seat frame 16 and panel structure 18 are illustrated and described in U.S. patent application Ser. No. 10/426,103, filed Apr. 29, 2003 by Michael R. Dennis for "Seat Structure with Anti-Spring Spanner Element". Reference is now made to that application for elaboration of these constructions, and the entire disclosure of that prior-filed application is hereby incorporated herein by reference.

With respect to what has been shown and mentioned so far in relation to FIG. 1, the dash-dot lines 16 which indicate seat frame 16 are shown in a condition overlapping vehicle frame 14. This has been done simply to represent an appropriate non-springy and rigid mounting of the former on the latter. The specific manner of such mounting forms no part of the present invention, but one will find a preferred approach to such mounting illustrated and described in the incorporated disclosure of the just-mentioned, prior-filed U.S. patent application.

Shown at 20 is a triggerable acceleration structure 20 which, herein, takes the form of a fluid-extensible, inflatable air bag, or fluid-extensible structure, (shown modestly shaded in FIG. 1). Fluidly and operatively connected to bag 20 is a pressurized-fluid (preferably air) system 22 which is generally referred to herein as trigger structure. Trigger structure 22 includes a device 24 (shown as an elongate inclined block) which functions herein as what is referred to as a catastrophic acceleration (or deceleration) threshold sensor, typically an appropriate form of a conventional accelerometer, suitably affixed preferably to seat frame 16. This sensor is suitably operatively connected, as indicated by dashed-arrow-headed line 26, to appropriate signal-data-processing structure represented by block 28, which is thence connected, as illustrated by an arrow 30, to an air/gas triggerable inflation structure 32, also preferably of conventional construction. Inflation structure 32 is appropriately fluid-connected, as illustrated by broken line 34, to air bag 20. The various lines and schematic blocks which are shown extending between sensor 24 and air bag 20 are referred to herein collectively as an operative connection between these two components.

It should be understood that while a specific form and organization of a trigger structure is illustrated in FIG. 1, other appropriate forms of such structure may be employed equally as well if so desired.

In the condition of things shown in solid lines in FIG. 1, air bag 20 is pictured in a fully flattened, or deflated, condition, appropriately resting on top of support expanse 18*a* in panel structure 18.

Completing a description of what is shown in FIG. 1, further included in the overall organization pictured there are a seated-occupant cushion, or cushioning structure, 36 which is fundamentally constructed of a two-layer arrangement of appropriate viscoelastic, acceleration-rate-sensitive materials, such as Confor CF-47 (lower layer) and Confor CF-45 (upper layer) made by EAR Specialty Composites in Indianapolis, Ind. Cushioning structure 36, which is also referred to as acceleration-rate-sensitive cushioning structure, is appropriately seated on top of air bag 20, and is preferably releasably attached effectively to fore and aft subframe panel-structure members 18*b*, 18*c*, respectively, of panel structure 18 through releasable attachment structure, such as hook-and-pile fastener structures, like the two shown at 38 in FIG. 1. While preferably included is a cushioning structure having characteristics like those described for structure 36, such a specialized cushioning structure may be omitted if desired, and without altering any of the fundamentally significant performance of the invention.

Attached in any appropriate manner adjacent the rear side of seat frame 16 is a conventional seat-back structure 40, to the front (left) side of which (in FIG. 1) is appropriately attached a seat-back cushion 42.

The slight angular inclination which is shown in FIG. 1 for the elongate block which represents sensor 24 is somewhat aligned with a downwardly pointing arrow 44 in FIG. 1, also similarly inclined. This arrow generally indicates the direction of impact advance of the structure of FIG. 1 during a catastrophic impact, such as an airplane crash. Opposing arrows 46, which are also modestly inclined, and which are disposed just to the left of cushion 42 in FIG. 1, are included in this figure to represent spinal compression forces which are exerted on a seated occupant's spine during a crash-impact event. In solid lines in FIG. 1, all of the seat-related components per se are illustrated generally in pre-impact conditions.

Explaining now how the structure of the present invention performs, sensor 24 functions to detect the level of downward deceleration experienced by seat frame 16, and thus by any seated occupant, and is appropriately designed to produce a suitable output signal on detecting an impact-caused downward deceleration which crosses a threshold value of about 5-G. Such a threshold value will typically be crossed at a moment in time which is about 10-ms or less beyond the very instant of initial impact.

When this threshold crossing occurs, and is detected by sensor 24, and confirmed by the processing structure contained in block 28, the latter sends an appropriate trigger signal to block 32, which then immediately implements an explosive acceleration, through inflation of air bag 20, upwardly beneath seat cushion 36 to the underside of a occupant seated in the structure of this invention. Such an explosive upward acceleration of an occupant, which lasts typically about 40-ms, and which produces an upward acceleration with a force of about 10-G to about 15-G, is represented by an arrow 48 presented near the left side of FIG. 1. In dashed lines shown at 20A and 36A in FIG. 1, air bag 20 is shown in its explosively inflated condition, and seat cushion 36 is shown (undeformed for convenience only) in an upwardly accelerated condition/disposition. In relation to this explosive acceleration activity, expanse 18*a* provides an appropriate resistance reaction to air-bag inflation, and cushion 36 implements/utilizes the phenomenon of structural acceleration-rate-sensitivity, in terms of substantially directly engaging a seated occupant.

In FIG. 2 in the drawings, this action and its invocation are represented by blocks 50, 52 which are shown operatively interconnected by a downwardly pointing arrow 54. Block 50 represents threshold detection of the impact event just described, and block 52 represents the action which then takes place to produce explosive upward acceleration.

The releasable interconnections initially established and in existence between structures 18, 36 through hook-and-pile fasteners 38 are released upon explosive inflation of bag 20.

A seated occupant is thus explosively upwardly accelerated within a tiny fragment of a second after initial crash impact. This behavior effectively reduces the downward velocity which will then exist to create compressive spinal forces as the triggering crash event fully develops. As was mentioned earlier, operation of the system and practice of the methodology of this invention are capable of reducing compressive spinal forces to conditions well below those which predictably create catastrophic and even fatal spinal injuries.

While a preferred embodiment and manner of practicing this invention have thus been described and illustrated herein, variations and modifications are appreciated to be possible which may be made well within the spirit and scope of the present invention.

I claim:

1. A vehicle safety seat for use in a vehicle having a vehicle frame comprising
    a fixed-position, anti-spring-back, broad-expanse, generally planar seatpan mounted above and spaced from the vehicle frame having a generally upwardly facing, fixed-position support surface, adapted to provide effective underlying support for an overlying seat-occupant cushioning structure disposed above said support surface,
    a triggerable acceleration structure disposed cooperatively relative to, and over and above, said support surface in a manner whereby said triggerable acceleration structure is operatively disposed between said support surface and any person occupying the seat, triggerable to accelerate such a person, translationally, and without rotation, upwardly away from, and relative to, said fixed-position support surface, thus to increase the vertical distance between such a person and said support surface, and
    trigger structure responsive to a preselected downward deceleration of said fixed-position seatpan to trigger said acceleration structure.

2. The seat of claim 1, wherein said acceleration structure includes fluid-extensible structure.

3. The seat of claim 2, wherein said fluid-extensible structure takes the form of an inflatable air bag.

4. The seat of claim 1 which further includes an acceleration-rate-sensitive cushioning structure operatively interposed said acceleration structure and any person occupying the seat.

5. The seat of claim 4, wherein said acceleration-rate-sensitive cushioning structure is viscoelastic.

6. A vehicle-associated, seated-occupant, catastrophic-impact safety practice comprising
    providing a non-springy seatpan for carrying the load of a seat occupant,
    mounting the seatpan on a seat frame, which is fixed to a vehicle floor, wherein the seatpan is spaced apart from and above the vehicle floor;
    detecting downward deceleration of such an occupant, and
    on such detected deceleration exceeding a predetermined threshold value, and utilizing the provided seatpan as a non-moveable reaction structure, explosively upwardly, and translationally without rotation, accelerating the occupant relative to the seatpan thus to reduce that occupant's downward vertical velocity.

7. The safety practice of claim 6 which further utilizes acceleration-rate-sensitivity in association with said explosively upwardly accelerating of a seat occupant relative to the seatpan.

8. A vehicle safety seat for use in a vehicle having a vehicle frame comprising
    a seat frame fixed to the vehicle frame,
    a fixed-position, anti-spring-back, broad-expanse, generally planar seatpan mounted on said seat frame, and carried thereby above and spaced from the vehicle frame, and having a generally upwardly facing, fixed-position support surface,
    a triggerable acceleration structure disposed cooperatively relative to, and over and above, said support surface in a manner whereby said triggerable acceleration structure is operatively disposed between said support surface and any person occupying the seat, triggerable to accelerate such a person, translationally, and without rotation, upwardly away from, and relative to, said fixed-position support surface, thus to increase the vertical distance between such a person and said support surface, and
    trigger structure responsive to a preselected downward deceleration of said fixed-position seatpan to trigger said acceleration structure.

9. The seat of claim 8, wherein said acceleration structure includes fluid-extensible structure.

10. The seat of claim 9, wherein said fluid-extensible structure takes the form of an inflatable air bag.

11. The seat of claim 8 which further includes an acceleration-rate-sensitive cushioning structure operatively interposed said acceleration structure and any person occupying the seat.

12. The seat of claim 11, wherein said acceleration-rate-sensitive cushioning structure is viscoelastic.

* * * * *